(12) United States Patent
Jung et al.

(10) Patent No.: US 12,529,517 B2
(45) Date of Patent: Jan. 20, 2026

(54) REFRIGERANT CYCLE PRESSURE CONTROL SYSTEM FOR RELIQUEFACTION SYSTEM FOR SHIP

(71) Applicant: Hanwha Ocean Co., Ltd., Geoje-Si (KR)

(72) Inventors: Hye Min Jung, Geoje-si (KR); Seon Jin Kim, Siheung-si (KR); Won Jae Choi, Siheung-si (KR); Seung Chul Lee, Seoul (KR)

(73) Assignee: Hanwha Ocean Co., Ltd., Geoje-si (KR)

( * ) Notice: Subject to any disclaimer, the term of this patent is extended or adjusted under 35 U.S.C. 154(b) by 259 days.

(21) Appl. No.: 18/261,990

(22) PCT Filed: Dec. 24, 2021

(86) PCT No.: PCT/KR2021/019888
§ 371 (c)(1),
(2) Date: Jul. 18, 2023

(87) PCT Pub. No.: WO2022/158736
PCT Pub. Date: Jul. 28, 2022

(65) Prior Publication Data
US 2024/0085101 A1    Mar. 14, 2024

(30) Foreign Application Priority Data

Jan. 19, 2021 (KR) .......................... 10-2021-0007521

(51) Int. Cl.
*F25J 1/02* (2006.01)
*F25J 1/00* (2006.01)

(52) U.S. Cl.
CPC .......... *F25J 1/0249* (2013.01); *F25J 1/0025* (2013.01); *F25J 1/0072* (2013.01); *F25J 1/0204* (2013.01);
(Continued)

(58) Field of Classification Search
CPC ........ F25J 1/0249; F25J 1/0025; F25J 1/0072; F25J 1/0204; F25J 1/0254; F25J 2205/02;
(Continued)

(56) References Cited

U.S. PATENT DOCUMENTS

| 5,524,456 A | 6/1996 | Stokes |
| 6,523,366 B1 * | 2/2003 | Bonaquist .............. F25J 1/0257 |
| | | 62/613 |

(Continued)

FOREIGN PATENT DOCUMENTS

| EP | 1959217 A2 * | 8/2008 | ............. F25J 1/0025 |
| EP | 2623414 A1 | 8/2013 | |

(Continued)

OTHER PUBLICATIONS

International Search Report dated Mar. 28, 2022 in International Application No. PCT/KR2021/019888.
(Continued)

*Primary Examiner* — Joel M Attey
*Assistant Examiner* — Ibrahim A. Michael Adeniji
(74) *Attorney, Agent, or Firm* — Knobbe, Martens, Olson & Bear, LLP

(57) ABSTRACT

A refrigerant cycle pressure control system includes: a heat exchanger cooling boil-off gas received from a storage tank; a refrigerant cycle including a refrigerant circulation line, a refrigerant compressor, and an expander; an inventory tank storing the refrigerant to be charged to the refrigerant cycle; a refrigerant supply line connecting the inventory tank to an upstream side of the refrigerant compressor to replenish the refrigerant cycle with the refrigerant; a refrigerant discharge line connecting a downstream side of the refrigerant compressor to the inventory tank to discharge the refrigerant from the refrigerant cycle to the inventory tank; and a pressure regulation line branched off of the refrigerant (Continued)

discharge line. The refrigerant cycle is depressurized by discharging the refrigerant from the refrigerant cycle through the refrigerant discharge line or the pressure regulation line.

8 Claims, 5 Drawing Sheets

(52) U.S. Cl.
CPC .......... *F25J 1/0254* (2013.01); *F25J 2205/02* (2013.01); *F25J 2290/72* (2013.01)

(58) Field of Classification Search
CPC ...... F25J 2290/72; F25J 2215/62; F25J 1/004; F25J 2210/42; F25J 2215/64; F25J 2230/30; F25J 1/005; F25J 1/0248; F25J 1/025; F25J 1/0277; F17C 2265/034; F17C 2265/037; F17C 2265/038; F17C 6/00; F17C 9/02; F17C 2221/032; F17C 2227/0341; F17C 2265/017; F17C 2265/033; F17C 2270/0105; B63J 2/14; B63J 2/12; B63B 25/16
See application file for complete search history.

(56) References Cited

U.S. PATENT DOCUMENTS

| | | | |
|---|---|---|---|
| 2017/0000543 A1* | 1/2017 | Mahrouche | C09K 5/041 |
| 2019/0072323 A1* | 3/2019 | Felbab | F25J 1/0025 |
| 2019/0162367 A1* | 5/2019 | Swab, Jr. | F17C 6/00 |

FOREIGN PATENT DOCUMENTS

| | | | | |
|---|---|---|---|---|
| JP | 2000266294 A | * | 9/2000 | |
| JP | 2009204026 A | * | 9/2009 | ............ F25J 1/0025 |
| KR | 10-0747371 B1 | | 8/2007 | |
| KR | 10-2116544 B1 | | 5/2020 | |
| KR | 10-2020-0067716 A | | 6/2020 | |
| KR | 10-2020-0070569 A | | 6/2020 | |
| KR | 10-2020-0101063 A | | 8/2020 | |

OTHER PUBLICATIONS

Extended European Search Report (EESR) received in EP Application No. 21921493.9 dated Dec. 18, 2024.
Japanese Office Action received in Japanese Application No. 2023-543297, dated May 21, 2024.

* cited by examiner

US 12,529,517 B2

REFRIGERANT CYCLE PRESSURE CONTROL SYSTEM FOR RELIQUEFACTION SYSTEM FOR SHIP

TECHNICAL FIELD

The present invention relates to a refrigerant cycle pressure control system for a reliquefaction system for ships and, more particularly, to a system for controlling the pressure in a refrigerant cycle circulating through a reliquefaction system for reliquefying boil-off gas generated in a ship.

BACKGROUND ART

Natural gas contains methane as a main component and has been attracting attention as an eco-friendly fuel that emits little or no environmental pollutants during combustion. Liquefied natural gas (LNG) is obtained by liquefying natural gas through cooling to about −163° C. under normal pressure and is suited to long-distance transportation by sea since it has a volume of about 1/600 that of natural gas in a gaseous state. Accordingly, natural gas is stored and transported as liquefied natural gas, which is easy to store and transport.

Since natural gas is liquefied at a cryogenic temperature of −163° C. under normal pressure, LNG storage tanks are typically insulated to maintain LNG in a liquid state. However, despite being insulated, such a storage tank is limited in ability to block external heat. Accordingly, due to external heat continuously transferred to the LNG storage tank, LNG stored in the LNG tank continues to evaporate naturally during transportation, causing generation of boil-off gas (BOG).

Continuous production of boil-off gas in the LNG storage tank increases the internal pressure of the LNG storage tank. If the internal pressure of the storage tank exceeds a predetermined safe pressure, this can cause an emergency situation such as rupture of the storage tank. Accordingly, there is a need to discharge boil-off gas from the storage tank using a safety valve. However, boil-off gas is a kind of LNG loss and is an important issue for transportation efficiency and fuel efficiency of LNG. Therefore, various methods are employed to handle boil-off gas generated in the LNG storage tank.

Recently, a method of using boil-off gas at a fuel demand site, such as an engine of a ship, a method of reliquefying boil-off gas and returning the reliquefied boil-off gas to an LNG storage tank, and a method combining these two approaches have been developed and put into use.

DISCLOSURE

[Technical Tasks]

In a reliquefaction cycle for reliquefaction of boil-off gas generated in a ship, typical available liquefaction methods include a process using a single mixed refrigerant (SMR) cycle and a process using a propane-precooled mixed refrigerant (C3MR) cycle. The C3MR cycle is a process in which natural gas is cooled using propane refrigerant alone and then is liquefied and subcooled using a mixed refrigerant, while the SMR cycle is a process in which natural gas is liquefied using a mixed refrigerant composed of multiple components.

As such, the SMR cycle and the C3MR cycle both use a mixed refrigerant. However, if the composition of the mixed refrigerant changes due to refrigerant leakage during liquefaction of boil-off gas, this can lead to poor liquefaction efficiency. Accordingly, there is a need to maintain constant composition of the refrigerant by continuously measuring the composition of the mixed refrigerant and replenishing lacking refrigerant components.

An alternative reliquefaction cycle to reliquefy boil-off gas is a single-cycle liquefaction process using nitrogen refrigerant.

Despite relative inefficiency compared to a reliquefaction cycle using a mixed refrigerant, such a reliquefaction cycle using nitrogen refrigerant is safer due to inert properties of nitrogen refrigerant and is easier to apply to ships since nitrogen refrigerant undergoes no phase change.

In a reliquefaction system using nitrogen refrigerant, a refrigerant stored in an inventory tank is supplied to a refrigerant cycle of the reliquefaction system and a load of the reliquefaction system is controlled by replenishing the refrigerant cycle with the refrigerant or by discharging the refrigerant from the refrigerant cycle depending on load requirements.

The present invention proposes a system that can control a load of a reliquefaction system through smooth replenishment of a refrigerant cycle with a refrigerant or discharge of the refrigerant from the refrigerant cycle while reducing use of a device for replenishment of the refrigerant cycle with nitrogen refrigerant.

Technical Solution

In accordance with one aspect of the present invention, a refrigerant cycle pressure control system for a reliquefaction system for a ship includes: a heat exchanger provided to the reliquefaction system and cooling boil-off gas received from a storage tank;

a refrigerant cycle including a refrigerant circulation line through which a refrigerant is circulated to cool the boil-off gas in the heat exchanger, a refrigerant compressor disposed on the refrigerant circulation line and compressing the refrigerant discharged from the heat exchanger after cooling the boil-off gas in the heat exchanger, and an expander expanding and cooling the refrigerant compressed by the refrigerant compressor and having been cooled through the heat exchanger and supplying the expanded and cooled refrigerant to the heat exchanger;

an inventory tank storing the refrigerant to be charged to the refrigerant cycle;

a refrigerant supply line connecting the inventory tank to an upstream side of the refrigerant compressor to replenish the refrigerant cycle with the refrigerant;

a refrigerant discharge line connecting a downstream side of the refrigerant compressor to the inventory tank to discharge the refrigerant from the refrigerant cycle to the inventory tank; and a pressure regulation line branched off of the refrigerant discharge line, wherein the refrigerant cycle is depressurized by discharging the refrigerant from the refrigerant cycle through the refrigerant discharge line or the pressure regulation line.

The refrigerant cycle pressure control system may further include: a first valve disposed on the refrigerant discharge line upstream of a point at which the pressure regulation line is branched off of the refrigerant discharge line; a second valve disposed on the pressure regulation line; and a third valve disposed on the refrigerant discharge line downstream of the point at which the pressure regulation line is branched off of the refrigerant discharge line, wherein, upon depressurization of the refrigerant cycle, the refrigerant is discharged first to the inventory tank through the refrigerant discharge line and is then discharged to the pressure regulation line when pressure reversal between the inventory tank and the refrigerant cycle occurs.

The refrigerant cycle pressure control system may further include: a buffer tank disposed in the ship and storing utility $N_2$ to be supplied to the ship; a drying and filtration unit drying and filtering the utility $N_2$ received from the buffer tank to reduce a dew point of the utility $N_2$; and a boosting compressor compressing nitrogen refrigerant having passed through the drying and filtration unit and supplying the compressed nitrogen refrigerant to the inventory tank.

The pressure regulation line may be connected to the buffer tank and the buffer tank may be operated at a lower pressure than the inventory tank.

The pressure regulation line may be connected to an upstream side of the boosting compressor.

The reliquefaction system may include a gas-liquid separator receiving the cooled boil-off gas from the heat exchanger and separating the received boil-off gas into a gas phase and a liquid phase, wherein the pressure regulation line may be connected to the gas-liquid separator such that the refrigerant discharged from the refrigerant cycle is supplied to a top of the gas-liquid separator to be used as an inert gas for pressure maintenance in the gas-liquid separator.

The inventory tank may include a high-pressure tank receiving the compressed nitrogen refrigerant from the boosting compressor and supplying the received nitrogen refrigerant to an upstream side of the refrigerant compressor and a low-pressure tank operated at a lower pressure than the high-pressure tank, wherein the pressure regulation line may be connected to the low-pressure tank.

The low-pressure tank may be operated using suction pressure of the boosting compressor and, when the low-pressure tank is pressurized by the refrigerant discharged to the pressure regulation line, the refrigerant may be discharged from the low-pressure tank to an upstream side of the boosting compressor to maintain a constant pressure in the low-pressure tank.

Advantageous Effects

The refrigerant cycle pressure control system according to the present invention can control a load of a reliquefaction system through smooth replenishment of a refrigerant cycle with a refrigerant or discharge of the refrigerant from the refrigerant cycle.

In particular, in the refrigerant cycle pressure control system according to the present invention, upon depressurization of the refrigerant cycle to reduce the load of the reliquefaction system, a refrigerant in the refrigerant cycle is discharged and sent first to an inventory tank and then, when no more refrigerant can be sent to the inventory tank due to pressure reversal, the refrigerant is sent to a buffer tank, a low-pressure tank, or an upstream side of a boosting compressor for reuse in the refrigerant cycle or for use as blanketing $N_2$ in a gas-liquid separator of the reliquefaction system, thereby reducing the use of devices for on-board nitrogen supply and thus reducing power consumption and operation expenses (OPEX) associated with the use of the devices.

MODE FOR INVENTION

Figure 1:
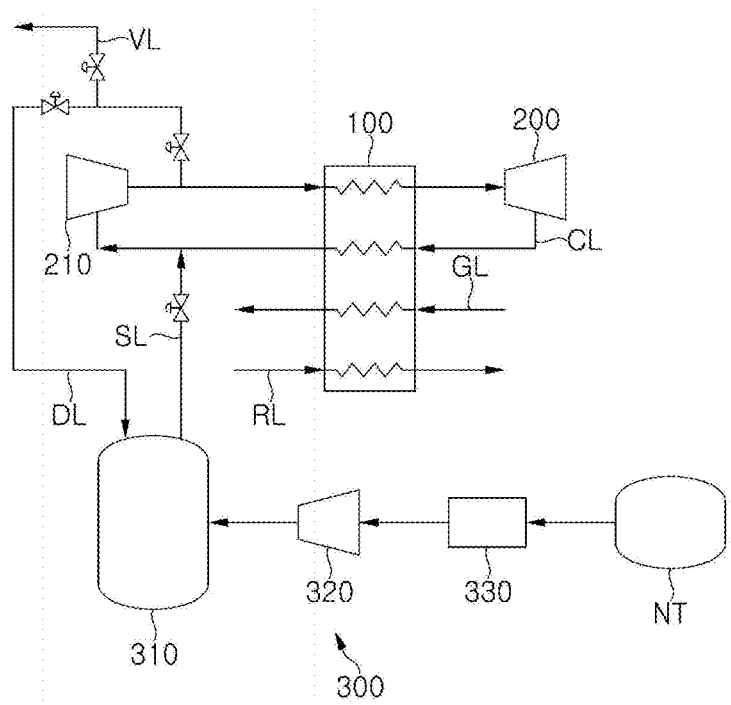
FIG. 1 is a schematic view of a refrigerant cycle pressure control system for a reliquefaction system for ships according to a basic embodiment of the present invention.
Figure 2:
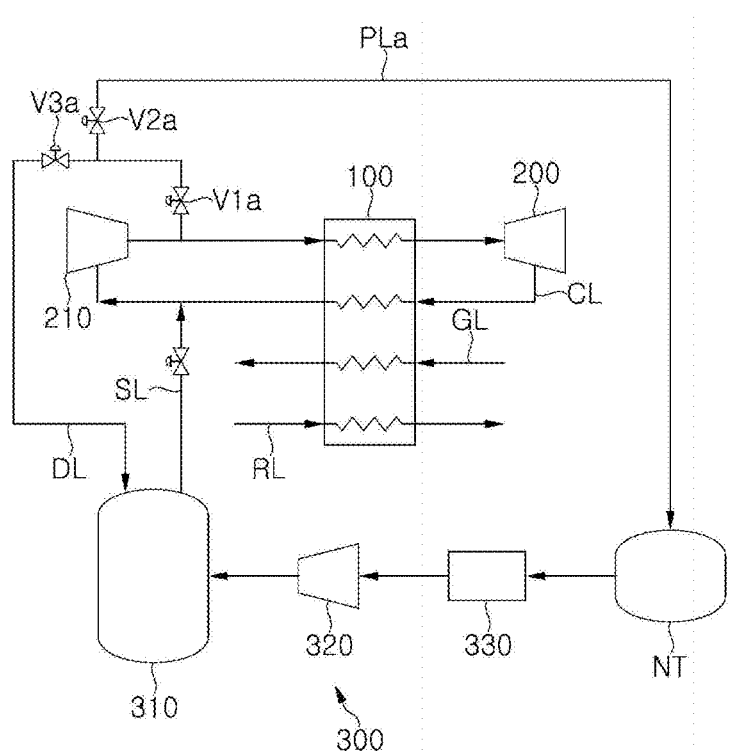
FIG. 2 is a schematic view of a refrigerant cycle pressure control system for a reliquefaction system for ships according to a first embodiment of the present invention.
Figure 3:
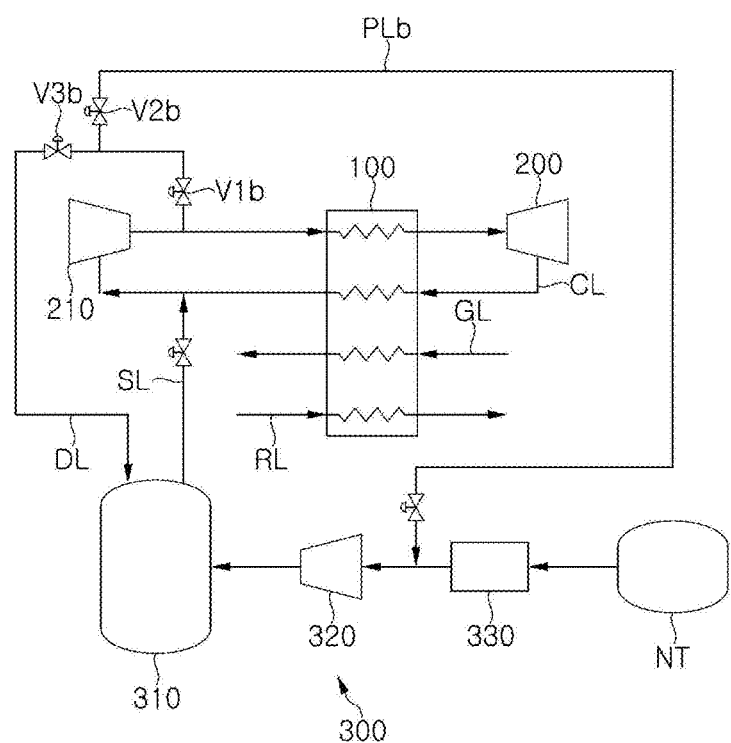
FIG. 3 is a schematic view of a refrigerant cycle pressure control system for a reliquefaction system for ships according to a second embodiment of the present invention.
Figure 4:
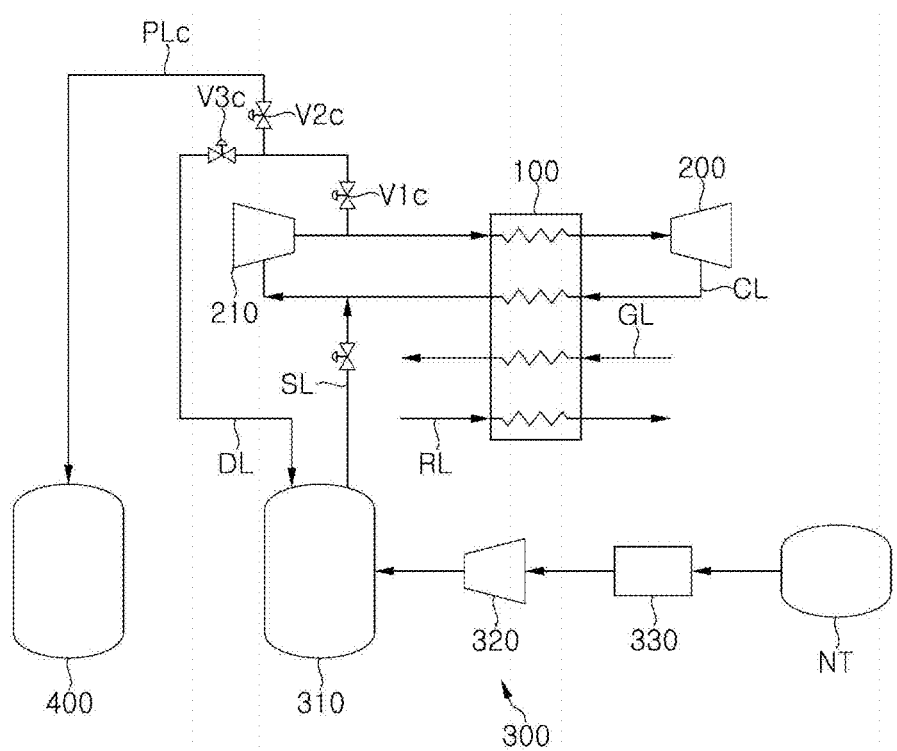
FIG. 4 is a schematic view of a refrigerant cycle pressure control system for a reliquefaction system for ships according to a third embodiment of the present invention.
Figure 5:
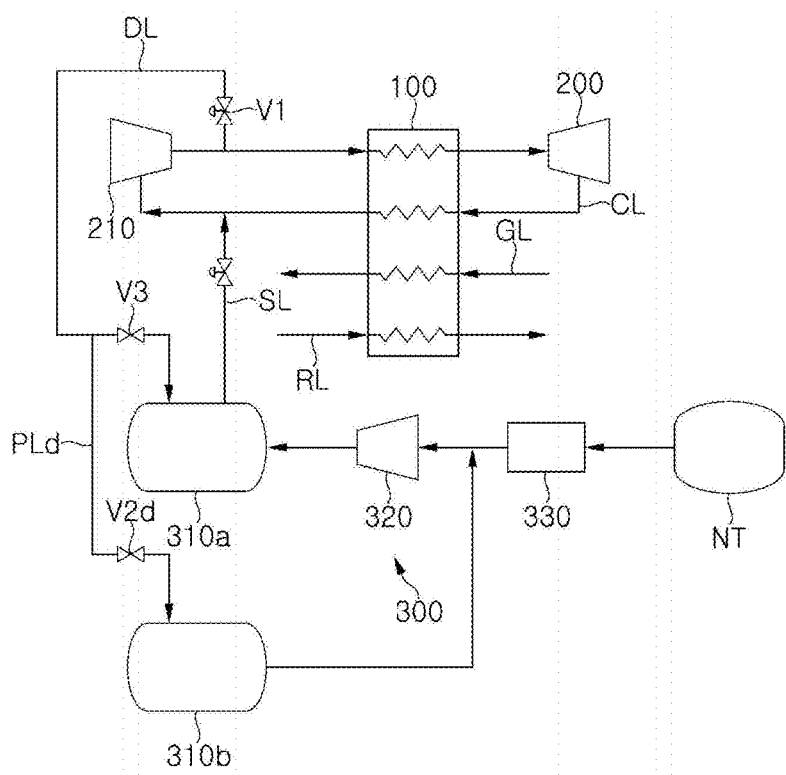
FIG. 5 is a schematic view of a refrigerant cycle pressure control system for a reliquefaction system for ships according to a fourth embodiment of the present invention.

In order to fully appreciate the operational advantages of the present invention and the objectives achieved by practicing the present invention, reference should be made to the accompanying drawings, which illustrate preferred embodiments of the present invention, and description thereof.

Hereinafter, exemplary embodiments of the present invention will be described in detail in terms of the features and effects thereof with reference to the accompanying drawings. It should be noted that like components will be denoted by like reference numerals throughout the specification and the accompanying drawings.

As used herein, the term "ship" may refer to any type of ship that is provided with a liquefied gas storage tank. For example, the ship may include self-propelled vessels, such as an LNG carrier, a liquid hydrogen carrier, and an LNG regasification vessel (RV), as well as non-self-propelled floating offshore structures, such as an LNG floating production storage offloading (FPSO) unit and an LNG floating storage regasification unit (FSRU).

In addition, the embodiments of the present invention may be applied to a reliquefaction cycle for any type of liquefied gas that can be transported in a liquid state by liquefaction at cryogenic temperatures and can generate boil-off gas during storage. For example, such liquefied gas may include liquefied petrochemical gas, such as liquefied natural gas (LNG), liquefied ethane gas (LEG), liquefied petroleum gas (LPG), liquefied ethylene gas, and liquefied propylene gas. In the following embodiments, the present invention will be described using LNG, which is a typical liquefied gas, as an example.

FIG. 1 is a schematic view of a refrigerant cycle pressure control system for a reliquefaction system for ships according to a basic embodiment of the present invention, and FIG. 2 to FIG. 5 are schematic views of refrigerant cycle pressure control systems for a reliquefaction system for ships according to first to fourth embodiments of the present invention, respectively.

Each of the refrigerant cycle pressure control systems according to these embodiments is intended to control a load of a reliquefaction system for ships by controlling the pressure in a refrigerant cycle of the reliquefaction system through replenishment of the refrigerant cycle with a refrigerant from a refrigerant supply unit 300 or discharge of the refrigerant from the refrigerant cycle.

The reliquefaction system reliquefies boil-off gas generated from liquefied gas in a storage tank of a ship by compressing and cooling the boil-off gas and returns the reliquefied boil-off gas to the storage tank. The reliquefaction system includes a compressor compressing boil-off gas, a heat exchanger cooling the compressed boil-off gas, a decompressor decompressing the boil-off gas cooled through the heat exchanger, and a gas-liquid separator separating the boil-off gas decompressed by the decompressor into a gas phase and a liquid phase.

Referring to FIG. 1 to FIG. 5, the refrigerant cycle circulates a refrigerant to cool boil-off gas in the heat exchanger 100. In the heat exchanger according to these embodiments, the refrigerant CL circulated in the refrigerant cycle and uncompressed boil-off gas GL introduced from the storage tank to the compressor are used as a cold heat source to cool compressed boil-off gas RL.

The refrigerant cycle includes: a refrigerant circulation line CL through which the refrigerant is circulated; a refrigerant compressor 210 disposed on the refrigerant circulation line and compressing the refrigerant discharged from the heat exchanger after cooling the boil-off gas; and an expander 200 expanding and cooling the refrigerant compressed by the refrigerant compressor and having been cooled through the heat exchanger and supplying the expanded and cooled refrigerant to the heat exchanger. The refrigerant compressor and the expander may be connected to each other via a common shaft to form a compander that uses energy from expansion of the refrigerant to compress the refrigerant.

For example, nitrogen ($N_2$) may be used as the refrigerant that is supplied to the heat exchanger while circulating through the refrigerant circulation line CL.

The refrigerant supply unit 300 supplies the refrigerant to the refrigerant cycle and includes: a drying and filtration unit 330 receiving utility $N_2$ from a buffer tank NT, which stores utility $N_2$ to be supplied to a ship, and drying the received utility $N_2$ to reduce a dew point thereof; a boosting compressor 320 receiving nitrogen from the drying and filtration unit and compressing the received nitrogen; and an inventory tank 310 receiving nitrogen refrigerant from the boosting compressor 320, storing the received nitrogen refrigerant therein, and supplying the stored nitrogen refrigerant to the refrigerant cycle.

As the amount of boil-off gas generated in the storage tank and intended to be reliquefied changes, the amount of cold heat required for the reliquefaction system changes. Here, the amount of cold heat in the refrigerant circulation line and the load of the reliquefaction system may be controlled by changing a mass flow rate of the refrigerant in the refrigerant circulation line through supply of some refrigerant from the refrigerant supply unit to the refrigerant cycle or through discharge of some refrigerant from the refrigerant circulation line while maintaining a ratio of compression work in the refrigerant compressor to expansion work in the expander at a fixed value without adjustment of a variable geometry nozzle (VGN) of the expander.

To this end, the refrigerant cycle pressure control system according to the present invention includes: a refrigerant supply line SL connecting the inventory tank 310 to an upstream side of the refrigerant compressor 210 to replenish the refrigerant cycle with the refrigerant; and a refrigerant discharge line DL connecting a downstream side of the refrigerant compressor to the inventory tank to discharge the refrigerant from the refrigerant cycle to the inventory tank.

More specifically, when the amount of cold heat required for the reliquefaction system increases, the mass flow rate of the refrigerant in the refrigerant cycle is increased by supplying some refrigerant from the inventory tank to the upstream side of the refrigerant compressor through the refrigerant supply line SL while maintaining the compression work-to-expansion work ratio of the compander at a fixed value without adjustment of the VGN.

Conversely, when the amount of cold heat required for the reliquefaction system decreases, the mass flow rate of the refrigerant in the refrigerant cycle is reduced by discharging some refrigerant in the refrigerant cycle from the downstream side of the refrigerant compressor to the inventory tank 310 through the refrigerant discharge line DL. Then, when no more refrigerant can be discharged to the inventory tank 310 due to pressure reversal between the operating pressure of the inventory tank and the pressure of the refrigerant discharged from the refrigerant circulation line CL through the refrigerant discharge line DL, the refrigerant cycle is depressurized as much as required by discharging the refrigerant to an exterior of the refrigerant supply unit through a vent line VL.

As such, the load of the reliquefaction system can be controlled through regulation of the mass flow rate of the refrigerant in the refrigerant cycle. However, discharging the refrigerant to the exterior of the unit through the vent line VL can cause refrigerant loss whenever capacity control is performed, which leads to the need to refill the inventory tank. Replenishment of the refrigerant cycle with the refrigerant requires supply of utility $N_2$ from an on-board buffer tank and operation of the related devices, such as the drying and filtration unit and the boosting compressor, which leads to increase in on-board nitrogen consumption and power consumption associated with operation of the devices.

The first to fourth embodiments described below are designed to solve this problem by allowing nitrogen refrigerant discharged for the purpose of regulating the amount of cold heat in the refrigerant cycle to be reused for cooling of boil-off gas or to be recycled for other on-board uses, thereby reducing on-board nitrogen consumption and power consumption.

To this end, a pressure regulation line PLa, PLb, PLc, or PLd is branched off of the refrigerant discharge line DL, a first valve V1a, V1b, V1c, or V1d is disposed on the refrigerant discharge line DL upstream of a point at which the pressure regulation line is branched off of the refrigerant discharge line DL, a second valve V2a, V2b, V2c, or V2d is disposed on the pressure regulation line PLa, PLb, PLc, or PLd, and a third valve V3a, V3b, V3c, or V3d is disposed on the refrigerant discharge line DL downstream of the point at which the pressure regulation line is branched off of the refrigerant discharge line DL, as shown in FIG. 2 to FIG. 5.

In these embodiments, upon depressurization of the refrigerant cycle to reduce the mass flow rate of the refrigerant in the refrigerant cycle, the first valve V1a, V1b, V1c, or V1d and the third valve V3a, V3b, V3c, or V3d are opened to discharge the refrigerant first to the inventory tank 310 through the refrigerant discharge line DL and then, when pressure reversal between the inventory tank and the refrigerant cycle occurs, the third valve V3a, V3b, V3c, or V3d is closed and the second valve V2a, V2b, V2c, or V2d is opened to discharge the refrigerant through the pressure regulation line PLa, PLb, PLc, or PLd. Each of the embodiments uses the refrigerant discharged through the pressure regulation line in a different way.

In the refrigerant cycle pressure control system according to the first embodiment (see FIG. 2), the pressure regulation line PLa is connected to the buffer tank NT. The buffer tank is operated at a lower pressure than the inventory tank. Accordingly, when pressure reversal between the inventory tank and the refrigerant cycle occurs during discharge of the refrigerant to the inventory tank 310 through the refrigerant discharge line DL, the second valve V2a is opened to discharge the refrigerant from the refrigerant circulation line to the buffer tank NT to control the pressure in the refrigerant cycle.

As such, by sending nitrogen refrigerant to the buffer tank for reuse instead of discharging the refrigerant overboard, use of devices for on-board generation and supply of utility $N_2$, such as a nitrogen generator and a nitrogen supply, can be reduced, thereby reducing power consumption.

In the refrigerant cycle pressure control system according to the second embodiment (see FIG. 3), the pressure regulation line PLb is connected to an upstream side of the boosting compressor 320 of the refrigerant supply unit. In this way, when no more refrigerant can be sent to the inventory tank due to pressure reversal, the refrigerant is supplied to the upstream side of the boosting compressor 320, rather than discharged overboard, to be compressed, stored, and reused, thereby reducing on-board nitrogen consumption and power consumption associated with the use of the devices for nitrogen supply.

In the refrigerant cycle pressure control system according to the third embodiment (see FIG. 4), the pressure regulation line PLc is connected to a top of the gas-liquid separator 400 of the reliquefaction system. The gas-liquid separator is supplied with an inert gas to prevent a vacuum from occurring therein and to maintain the internal pressure of the gas-liquid separator upon discharge of a separated liquefied gas therefrom. In this embodiment, nitrogen refrigerant discharged from the refrigerant cycle is supplied to the gas-liquid separator by connecting the pressure control line to the top of the gas-liquid separator. In this way, nitrogen discharged from the refrigerant cycle can be utilized as blanketing $N_2$, thereby reducing on-board nitrogen consumption and power consumption associated with the use of the devices for nitrogen supply.

In the refrigerant cycle pressure control system according to the fourth embodiment (see FIG. 5), the inventory tank includes two tanks with different operating pressures, that is, a high-pressure tank 310a receiving compressed nitrogen refrigerant from the boosting compressor and supplying the received nitrogen refrigerant to an upstream side of the refrigerant compressor and a low-pressure tank 310b operated at a lower pressure than the high-pressure tank, and the pressure regulation line PLd is connected to the low-pressure tank 310b.

The low-pressure tank is operated using suction pressure of the boosting compressor.

Upon depressurization of the refrigerant cycle to reduce the mass flow rate of the refrigerant in the refrigerant cycle, the first and third valves V1d, V3d are opened to discharge the refrigerant first to the high-pressure tank 310a of the inventory tank through the refrigerant discharge line DL and then, when pressure reversal between the high-pressure tank and the refrigerant cycle occurs, the third valve V3d is closed and the second valve V2d is opened to discharge the refrigerant to the low-pressure tank 310b through the pressure regulation line PLd.

When the low-pressure tank is pressurized by the refrigerant discharged to the pressure regulation line, the refrigerant is discharged from the low-pressure tank 310b to an upstream side of the boosting compressor 320 to maintain a constant pressure in the low-pressure tank. The refrigerant discharged from the low-pressure tank may be supplied to the high-pressure tank through the boosting compressor to replenish the refrigerant cycle.

As such, by sending the refrigerant to the low-pressure tank, rather than discharging the refrigerant overboard, and then supplying the refrigerant to the upstream side of the boosting compressor for reuse, on-board nitrogen consumption can be reduced, the pressure in the high-pressure tank supplying the refrigerant to replenish the refrigerant cycle can be maintained constant for stable operation, and power consumption associated with the use of the devices for nitrogen supply can be reduced.

Although some embodiments have been described herein, the present invention is not limited to the above embodiments and may be practiced in various modifications or variations without departing from the technical spirit of the invention, as will be apparent to one of ordinary skill in the art to which the present invention pertains.

The invention claimed is:

1. A refrigerant cycle pressure control system for a reliquefaction system for a ship, comprising:
   a heat exchanger provided to the reliquefaction system and configured to cool boil-off gas received from a storage tank;
   a refrigerant cycle comprising a refrigerant circulation line through which a refrigerant is circulated to cool the boil-off gas in the heat exchanger, a refrigerant compressor disposed on the refrigerant circulation line and configured to compress the refrigerant discharged from the heat exchanger after cooling the boil-off gas in the heat exchanger, and an expander configured to expand and cool the refrigerant compressed by the refrigerant compressor and having been cooled through the heat exchanger and supply the expanded and cooled refrigerant to the heat exchanger;
   an inventory tank configured to store the refrigerant to be charged to the refrigerant cycle;
   a refrigerant supply line connecting the inventory tank to an upstream side of the refrigerant compressor to replenish the refrigerant cycle with the refrigerant;
   a refrigerant discharge line connecting a downstream side of the refrigerant compressor to the inventory tank to discharge the refrigerant from the refrigerant cycle to the inventory tank; and
   a pressure regulation line branched off of the refrigerant discharge line,
   wherein the refrigerant cycle pressure control system is configured to discharge the refrigerant from the refrigerant cycle through the refrigerant discharge line or the pressure regulation line to depressurize the refrigerant cycle,
   wherein, to depressurize the refrigerant cycle, the refrigerant cycle pressure control system is configured to discharge the refrigerant first to the inventory tank through the refrigerant discharge line, and then discharge the refrigerant to the pressure regulation line in response to pressure reversal between the inventory tank and the refrigerant cycle, and
   wherein the refrigerant cycle pressure control system further comprises a device connected to the pressure regulation line and configured to receive the discharged refrigerant through the pressure regulation line to reuse the discharged refrigerant for onboard utility, or for blanketing, instead of discharging the refrigerant overboard.

2. The refrigerant cycle pressure control system according to claim 1, further comprising:
   a first valve disposed on the refrigerant discharge line upstream of a point at which the pressure regulation line is branched off of the refrigerant discharge line;
   a second valve disposed on the pressure regulation line; and
   a third valve disposed on the refrigerant discharge line downstream of the point at which the pressure regulation line is branched off of the refrigerant discharge line.

3. The refrigerant cycle pressure control system according to claim 1, further comprising:
the device comprising a buffer tank disposed in the ship and configured to store utility $N_2$ to be supplied to the ship;
a drying and filtration unit configured to dry and filter the utility $N_2$ received from the buffer tank to reduce a dew point of the utility $N_2$; and
a boosting compressor configured to compress nitrogen refrigerant having passed through the drying and filtration unit and supply the compressed nitrogen refrigerant to the inventory tank.

4. The refrigerant cycle pressure control system according to claim 3, wherein the pressure regulation line is connected to the buffer tank and the buffer tank is operated at a lower pressure than the inventory tank.

5. The refrigerant cycle pressure control system according to claim 1, further comprising:
a buffer tank disposed in the ship and configured to store utility $N_2$ to be supplied to the ship;
a drying and filtration unit configured to dry and filter the utility $N_2$ received from the buffer tank to reduce a dew point of the utility $N_2$; and
the device comprising a boosting compressor configured to compress nitrogen refrigerant having passed through the drying and filtration unit and supply the compressed nitrogen refrigerant to the inventory tank,
wherein the pressure regulation line is connected to an upstream side of the boosting compressor.

6. The refrigerant cycle pressure control system according to claim 1, wherein:
the reliquefaction system comprises the device comprising a gas-liquid separator configured to receive the cooled boil-off gas from the heat exchanger and separate the received boil-off gas into a gas phase and a liquid phase; and
the pressure regulation line is connected to the gas-liquid separator and configured to supply the refrigerant discharged from the refrigerant cycle to a top of the gas-liquid separator to use the refrigerant discharged from the refrigerant cycle as an inert gas for pressure maintenance in the gas-liquid separator.

7. The refrigerant cycle pressure control system according to claim 1, further comprising:
a buffer tank disposed in the ship and configured to store utility $N_2$ to be supplied to the ship;
a drying and filtration unit configured to dry and filter the utility $N_2$ received from the buffer tank to reduce a dew point of the utility $N_2$; and
a boosting compressor configured to compress nitrogen refrigerant having passed through the drying and filtration unit and supply the compressed nitrogen refrigerant to the inventory tank,
wherein the inventory tank comprises a high-pressure tank configured to receive the compressed nitrogen refrigerant from the boosting compressor and supply the received nitrogen refrigerant to the upstream side of the refrigerant compressor, and
wherein the device comprises a low-pressure tank having a pressure lower than that of the high-pressure tank; and
wherein the pressure regulation line is connected to the low-pressure tank.

8. The refrigerant cycle pressure control system according to claim 7, wherein:
the low-pressure tank is operated using suction pressure of the boosting compressor; and,
when the low-pressure tank is pressurized by the refrigerant discharged to the pressure regulation line, the refrigerant is discharged from the low-pressure tank to an upstream side of the boosting compressor to maintain a constant pressure in the low-pressure tank.

\* \* \* \* \*